United States Patent

[11] 3,583,211

| [72] | Inventors | Kilian H. Brech<br>Norwalk;<br>John S. Oliano, Trumbull, both of, Conn. |
|---|---|---|
| [21] | Appl. No. | 776,828 |
| [22] | Filed | Nov. 18, 1968 |
| [45] | Patented | June 8, 1971 |
| [73] | Assignee | Branson Instruments, Inc.<br>Stamford, Conn.<br>Continuation-in-part of application Ser. No. 748,662, July 30, 1968, now abandoned. |

[54] PULSE-ECHO ULTRASONIC TEST APPARATUS
4 Claims, 4 Drawing Figs.

[52] U.S. Cl. .................................................. 73/67.8
[51] Int. Cl. ......................................................... G01n 29/04
[50] Field of Search .......................................... 73/67.5, 67.7, 67.8, 67.9

[56] References Cited
UNITED STATES PATENTS

| 3,272,000 | 9/1966 | Stebbins | 73/67.8X |
| 3,423,992 | 1/1969 | Dory | 73/67.9 |
| 3,041,872 | 7/1962 | Brown et al. | 73/67.9 |
| 2,984,756 | 5/1961 | Bradfield | 73/67.5 |

FOREIGN PATENTS

| 951,277 | 3/1964 | Czechoslovakia | 73/67.8 |
| 822,898 | 11/1959 | Great Britain | 73/67.8 |

*Primary Examiner*—James J. Gill
*Attorney*—Ervin B. Steinberg

ABSTRACT: In a pulse-echo ultrasonic test apparatus which includes an ultrasonic energy transducer coupled via a coupling means to a workpiece and producing a search beam which enters the workpiece at an angle deviating from 90° to the workpiece surface, the transducer body is provided with a reflection surface for receiving a portion of the search beam energy reflected at the surface of the workpiece and for reflecting such energy back to the transducer. This arrangement provides an echo signal which simulate a rear surface reflection. The occurrence of this echo signal is monitored to ascertain the existence of acoustic energy transfer between the transducer and workpiece.

KILIAN H. BRECH
JOHN S. OLIANO
INVENTORS.

BY:

Ervin B. Steinberg

PULSE-ECHO ULTRASONIC TEST APPARATUS

This application is a continuation-in-part of copending application Ser. No. 748,662 filed July 30, 1968 now abandoned.

This invention refers to pulse-echo ultrasonic test apparatus and more specially concerns a pulse-echo ultrasonic test apparatus with means for ascertaining that ultrasonic energy propagated from the transducer reaches the surface of a workpiece to be tested. Signalling means are provided to indicate the condition when the transfer of ultrasonic energy between the transducer and the workpiece surface is lost.

In the normal pulse-echo ultrasonic test setup when a transducer providing ultrasonic energy is coupled by means of a coupling means to a workpiece and the ultrasonic energy enters the workpiece at an angle which is substantially normal to the workpiece surface, a first search pulse responsive echo signal is obtained at the object front or entrant surface and a subsequent second signal is obtained from either an acoustic discontinuity within the workpiece, such as a flaw, or from the rear surface of the workpiece. Therefore, by monitoring, especially on a cathode ray tube, the echo signal arising from either a flaw within the workpiece or arising from the rear surface of the workpiece, it is possible to continuously monitor and ascertain that energy is being propagated within the workpiece. In the absence of proper coupling, such as may be caused by a lack of an engagement force or a loss of the coupling medium or couplant between the transducer and the workpiece surface, the search pulse responsive echo signal disappears and the lack of a proper test condition is readily discernible. In fact, gate means have been designed and incorporated in automatic test equipment to establish the presence or absence of the rear surface echo and to provide a signal for denoting the absence of a rear surface echo.

However, when the ultrasonic beam is transmitted into an object under test at an acute angle relative to the front surface, a reflection from the rear surface of the object is not apparent at the transducer and, therefore, in the absence of a flaw responsive echo it is difficult to establish whether ultrasonic energy actually enters the workpiece. Adequate coupling of ultrasonic energy between the transducer and the workpiece is generally assumed although loss of such coupling unbeknown to the operator may actually occur. In order to avoid this condition, the prior art, notably U.S. Pat. No. 2,667,780 issued to H. E. Van Valkenburg, entitled "Ultrasonic Inspection Device," dated Feb. 2, 1954 and U.S. Pat. No. 2,875,607 issued to J. R. Boxcer et al., entitled "Ultrasonic Testing Apparatus," dated Mar. 3, 1959, disclose transducer arrangements wherein auxiliary transducers are used for providing ultrasonic energy beams which create back reflections in the workpiece and the presence of such back reflection is monitored.

It is readily apparent that the use of auxiliary transducers is cumbersome and relatively expensive. Also, additional circuitry is required which unduly complicates the complexity of a sophisticated test setup.

In contrast with the prior art arrangements noted hereinabove, the present invention utilizes a passive reflecting surface provided on the transducer probe, such surface being adapted to receive reflected energy caused by the ultrasonic search signal entering the workpiece at an angle deviating from normal, and the reflected energy then being transmitted back to the transducer for denoting on a monitoring circuit the condition of an ultrasonic search beam having entered the workpiece. This arrangement is particularly useful when the transducer is coupled to the workpiece via a liquid coupling medium, such as water, since the transit time of ultrasonic energy through water is relatively long in comparison with the transit time of the ultrasonic energy within a workpiece, such as steel. This condition causes the signal reflected from the reflection surface to arrive later in time than an echo arising from a flaw lying within the normal search distance within the workpiece. Therefore, the signal created by the reflection surface has, for all practical purposes, the appearance of a rear surface echo and monitoring of this reflection signal can be accomplished in a relatively simple and inexpensive manner.

One of the principal objects of this invention is, therefore, the provision of a new and improved pulse-echo ultrasonic test apparatus which is adapted to overcome several of the shortcomings of the prior art devices.

Another object of this invention is the provision of a pulse-echo ultrasonic test apparatus adapted for use when the ultrasonic search beam enters the workpiece under test at an angle deviating from 90° to the workpiece entrant surface, such as is the case in angle beam testing.

A further object of this invention is the provision of a pulse-echo ultrasonic test apparatus for angle beam testing and including means for monitoring the condition of adequate acoustic coupling between the transducer from which ultrasonic energy emanates and the workpiece into which a search beam is sent.

Further and still other objects of this invention will be more clearly apparent by reference to the following description when taken in conjunction with the accompanying drawings, in which.

Figure 1:
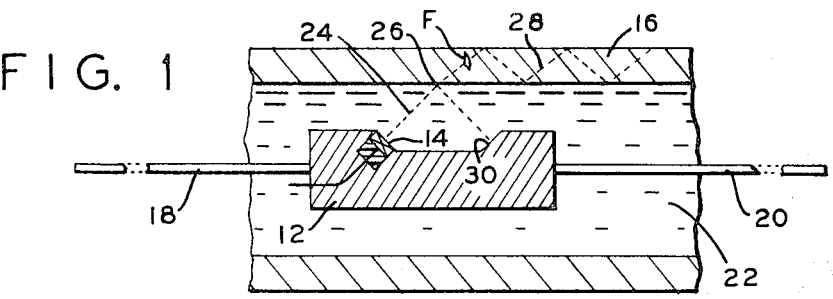
FIG. 1 is a sectional view, partly in schematic form, of a transducer probe disposed in a tubing for testing by means of ultrasonic energy the integrity of the tubing.

Referring now to the figures and FIG. 1 in particular, numeral 12 identifies a transducer probe body which is fitted with piezoelectric ultrasonic transducer, typically a wafer of lithium sulfate. The transducer probe body 12 is designed to be fed through the interior of the metal tubing 16, the object to be tested, by means of support means 18 and 20. It shall be understood that the transducer probe body or the support means are provided with means for centering the probe 12 within the tubing 16, but such centering means do not form an aspect of the present invention. The inside of the tubing 16 and particularly the space between the transducer probe 12 and the tubing 16 is filled with a coupling means 22, typically a liquid such as water. The actual construction of a transducer probe and the mounting of the wafer 14 within such body is well described in the prior art, see for instance "Ultrasonics" (book), by B. Carlin, McGraw-Hill Book Co. Inc., New York, N.Y. (1960).

In order to test the integrity of the tubing 16 it is necessary that the ultrasonic energy provided by the transducer 14 be propagated within the wall of the tubing 16 and to this end the ultrasonic energy is directed in such a manner that it enters the workpiece at an angle deviating from 90° with respect to the exposed workpiece surface. Depending on the angle of incidence, longitudinal and/or shear wave energy is produced. As seen in FIG. 1, the piezoelectric transducer 14 is disposed at an angle to the surface of the tubing so that the ultrasonic beam generated by the transducer 14 and propagated along an axis 24, enters the tubing 16 at the location 26 and is then propagated within the workpiece in a zigzag pattern as indicated by the dashed line 28. If a flaw F is present, such flaw is intercepted by the search beam and causes a reflection or echo signal which is sensed by the transducer 14. However, as the beam 28 is propagated within the workpiece, in the absence of a flaw, no rear surface responsive echo signal is discerned.

For the purpose of producing, in the absence of a defect or flaw within the tubing, an echo signal which is indicative of the condition that ultrasonic energy is being received by the workpiece 16, the transducer probe 12 is provided with a small reflection surface 30. A portion of the ultrasonic search beam propagated from the transducer 14 along the axis 24 is deflected at the workpiece entrant surface location 26 and transmitted toward the reflection surface 30, suitably disposed to receive the reflected energy. The change in acoustic impedance occurring at he interface between the coupling means 22 and the reflection surface 30 causes a reflection of the ultrasonic energy and such energy is directed back to the location 26 at which the energy once again is reflected and sensed by the transducer 14, manifesting itself as an echo signal. Since the transit time of the ultrasonic signal through the path spanning the coupling means 22 is considerably longer than the transit time of the ultrasonic energy within the workpiece 16 through the region normally explored, the echo arising from the reflection at the surface 30 arrives at the transducer 14 considerably later in time than an echo signal produced by the flaw F. Thus, the present arrangement simulates the presence of a rear surface echo. If adequate acoustic coupling between the transducer 14 and the workpiece 16 is lost, such as may e caused by a lack or the absence of the coupling means 22, the search beam emanating from the transducer 14 does not impinge upon the location 26 and consequently no reflection of the ultrasonic energy occurs. Hence, the absence of this simulated rear surface echo signal indicates that no testing is performed. It is most important to discern the absence of the "no test" condition since the lack of a flaw responsive echo signal under such condition is completely meaningless and actually may lead to an erroneous conclusion as to the soundness of the object.

Figure 2:
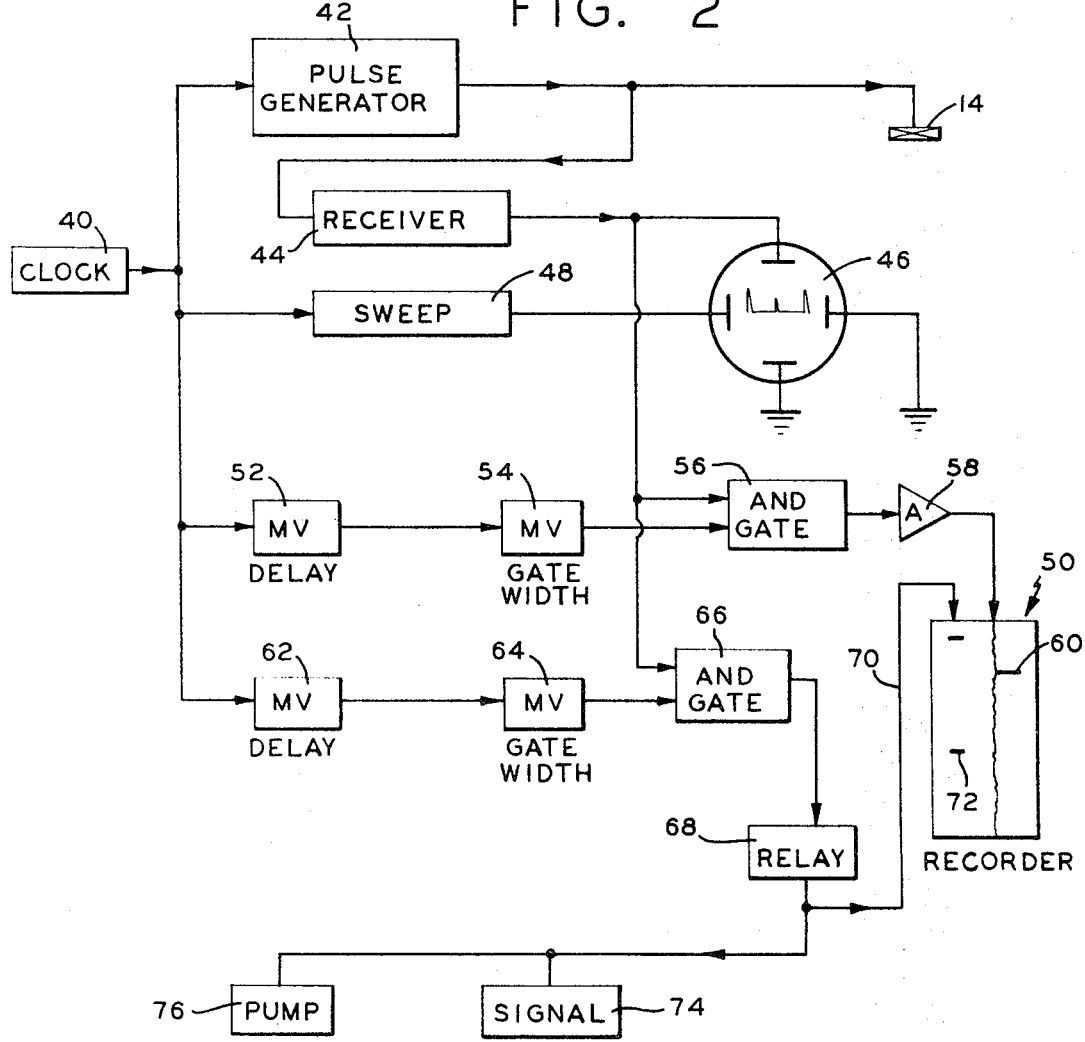
FIG. 2 is a schematic electrical circuit diagram of the improved apparatus.

Referring nw to the electrical circuit diagram per FIG. 2, numeral 40 indicates a clock or synchronizer which periodically provides a signal to the pulse generator 42 which, in turn, provides a train of electrical pulses at an ultrasonic frequency to the transducer 14. The transducer transforms the electrical energy applied to acoustic energy which is sent toward the object. A receiver circuit 44 is connected to the transducer 14 and is adapted to received the echo signals which are displayed on the screen of a cathode ray tube 46, using the vertical deflection plates. The clock 40 also is coupled to a sweep circuit 48 which, by being connected to the horizontal deflection plates of the cathode ray tube, provides the time axis along the face of the cathode ray tube 46. The above described circuit elements are quite conventional and are described, for instance, in U.S. Pat. No. 2,398,701, F. A. Firestone, "Supersonic Inspection Device," Apr. 16, 1946.

A graphic record of the presence or absence of flaws and the location thereof is provided by means of a recorder 50 which includes, inter alia, a stylus, a recording chart and a chart drive mechanism. The region of the workpiece 16 under observation is determined by the setting of a time gate means comprising a delay gate 52 and a width gate 54, both being bistable multivibrators. These multivibrators preferably are equipped with respective adjusting means (not shown) so as to vary the delay with regard to the synchronizing pulse generated by the clock 40, and to vary the width of the gate. An AND gate 56 is coupled to receive one input from the multivibrator 54 and the other input from the output side of the receiver 44. If a flaw responsive echo signal is received by the receiver 44 during the time in which the time gate is open, the AND gate 56 produces an output signal which is amplified by the amplifier 58 and applied to the stylus input of the recorder 50, causing a deflection such as is shown at numeral 60.

Further time gate means are provided for detecting the presence or absence of the reflection signal created at the surface 30. These gate means include a bistable multivibrator 62 coupled to the clock 40, and a bistable multivibrator 64 coupled to the multivibrator 62. As before, both multivibrators, by means of adjustable controls (not shown), are adapted to establish an adjustable time gate. An AND gate 66 is connected to receive one input signal from the multivibrator 64 and the other input signal from the echo receiver circuit 44. The time gate is adjusted so that it is open during the time lapse in which the reflection surface 30 caused echo signal is expected. Therefore, an output signal from the AND gate 66 occurs only if the reflection signal is sensed by the transducer 14 within the predetermined time interval.

A relay circuit 68 is coupled to the output from the AND gate 66 and is connected to be responsive to the absence of the reflection responsive echo signal from the AND gate 66. It follows, therefore, that no output from the relay circuit is obtained when the reflection responsive signal occurs during the predetermined interval which is synchronized with the sending of the search pulse. In the absence of an input signal from the AND gate 66, an output signal is obtained from the relay circuit 68 and such output signal is connected via a conductor 70 to the event marker input of the recorder 50, causing a mark on the recording chart such as is indicated by numeral 72. A mark of this type indicates that there existed, at least for a moment, a loss of acoustic coupling between the transducer 14 and the workpiece 16 and, therefore, no test was performed during this time. The absence of such acoustic coupling may be caused, for instance, by a loss of coupling liquid, a defective transducer which fails to propagate ultrasonic energy, defective pulse generator, or other factors. The output from the relay circuit is connected also to a signalling device 74, such as an audio or visual alarm device, and additionally to a feed pump 76 to immediately feed liquid couplant 22 into the space between the workpiece 16 and the transducer body 12 in the event that acoustic coupling was lost because of a lack of couplant liquid.

Figure 3:
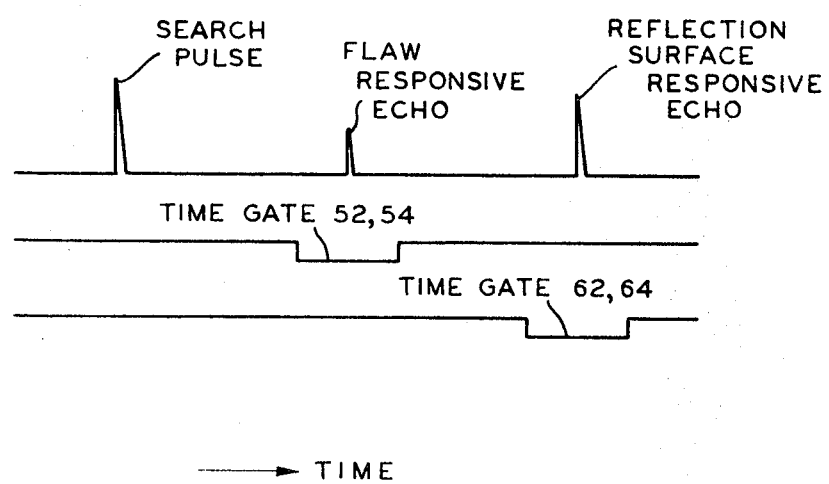
FIG. 3 is a timing diagram, showing in schematic form, the occurrence of several signals produced by the electrical circuit per FIG. 2.

FIG. 3 shows the time responsive occurrence of a typical set of pulses and the opening and closing of the two time gates described above.

Figure 4:
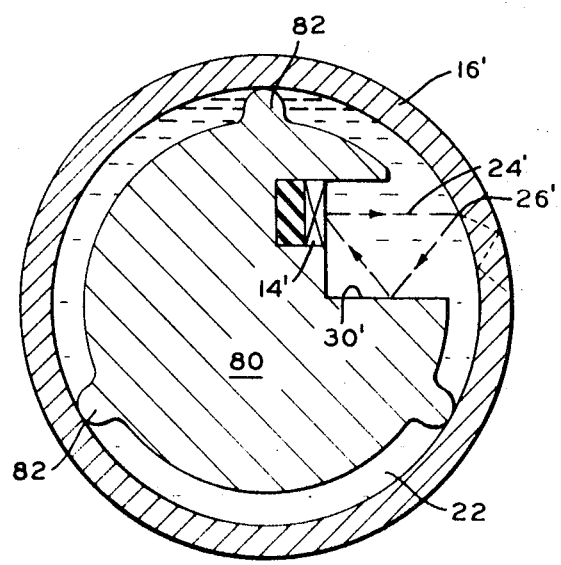
FIG. 4 is a sectional view of another embodiment of the invention.

A slightly different embodiment of the transducer probe body and of the associated reflection surface is shown in FIG. 4. The transducer probe body 80 is provided with three radial projections 82 for contacting the inside surface of a round tubing 16'. The space between the probe body and the tubing is filled with a liquid coupling means 22.

As in FIG. 1, the transducer probe body 80 is provided with a piezoelectric transducer 14' for providing ultrasonic signals in response to electrical energization from an electric pulse generator. The transducer 14' is disposed so that the ultrasonic signal 24' emanating therefrom traverses the coupling means 22 and enters the tubing 16' at the location 26', an then is propagated within the tubing as a shear wave or Lamb wave, or combination thereof, depending on the angle of incidence. The interface between the coupling means and tubing at the location 26' causes a portion of the ultrasonic energy to be reflected toward the signal reflecting surface 30' of the probe body 80. The surface 30' is disposed to cause the reflected signal to be reflected through the coupling means 22 directly back to the transducer 14', without retracing the previous path, for providing a reflection responsive echo signal. As stated previously in connection with FIG. 1, no echo signal is derived in the absence of the coupling means filling the space between the probe body and the tubing. The difference between the arrangement per FIG. 1 and that per FIG. 4 resides essentially in the length of the path of the reflection signal. The circuit as shown in FIG. 2 remains the same for either embodiment.

It will be seen that the above arrangements describe relatively simple means foe ascertaining the condition of adequate coupling of ultrasonic energy between a transducer and a workpiece when a reflection signal or echo from the rear surface of the workpiece is not available or discernible. The combination of elements shown hereinabove accomplishes this monitoring function without the use of auxiliary transducers and thereby constitutes a simple, reliable and most convenient advance in the art.

What we claim is:

1. In a pulse-echo ultrasonic test apparatus the combination of:

a transducer probe including a housing mounting an electroacoustic transducer which is adapted to periodically transmit an ultrasonic signal pulse through a liquid coupling means into an object to be tested whereby such signal enters the surface of the object at an angle deviating from 90° and said coupling means forms a signal path between said transducer and object;

a signal reflecting surface disposed on said probe for being contacted by said coupling means and for receiving an acoustic signal arising from a reflection of the transmitted ultrasonic signal pulse at the interface between said liquid coupling means and the object surface; said signal reflecting surface being shaped to reflect such received signal through said coupling means and object surface back to said electroacoustic transducer to provide an echo signal;

electrical pulsing means coupled for periodically energizing said electroacoustic transducer and causing said transducer to transmit said ultrasonic signal pulse;

electrical circuit means including time gate means coupled to said electroacoustic transducer and responsive to said electrical pulsing means for determining the absence of the signal pulse responsive echo signal reflected at said signal reflecting surface within a preset time interval subsequent the transmitting of said signal pulse, and feeding means for feeding said liquid coupling means into the space between said probe and object, said feeding means being coupled to said electrical circuit means for being activated in the absence of said echo signal.

2. In a pulse-echo ultrasonic test apparatus the combination of:

a transducer probe adapted to be inserted into a tubular object, said probe comprising a housing mounting an electroacoustic transducer which is adapted to periodically transmit an ultrasonic signal pulse through a liquid coupling means into the tubular object to be tested, said coupling means if adequately filling the space between said object and said probe in combination with the orientation of said electroacoustic transducer relative to said object causing said signal pulse to enter the surface of said object to be tested at an angle deviating from 90°;

a signal reflecting surface disposed on said housing and exposed for contact with said coupling means for receiving an acoustic signal arising from a reflection of a portion of the ultrasonic signal pulse at the interface between said coupling means and said object surface, and said signal reflecting surface being adapted to reflect such received signal through said liquid coupling means back to said electroacoustic transducer to provide an echo signal;

electrical pulsing means coupled for periodically energizing said electroacoustic transducer and causing said transducer to transmit said ultrasonic signal pulse;

electrical circuit means including time gate means coupled to said electroacoustic transducer and being responsive to said electrical pulsing means for determining the absence of said echo signal within a predetermined time interval subsequent the transmittal of said signal pulse;

said probe having projections for contacting said object in fixed spatial relation, and said signal path through said coupling means between said electroacoustic transducer, object surface and signal reflecting surface being so dimensioned that said echo signal is expected to be sensed by said electroacoustic transducer later than a flaw responsive echo signal generated within the object region tested responsive to transmitting said signal pulse.

3. In a pulse-echo ultrasonic test apparatus the combination of:

a transducer probe adapted to be inserted into a tubular object, said probe comprising a housing mounting an electroacoustic transducer which is adapted to periodically transmit an ultrasonic signal pulse through a liquid coupling means into the tubular object to be tested, said coupling means if adequately filling the space between said object and said probe in combination with orientation of said electroacoustic transducer relative to said object causing said signal pulse to enter the surface of said object to be tested at an angle deviating from 90°;

a signal reflecting surface disposed on said housing and exposed for contact with said coupling means for receiving an acoustic signal arising from a reflection of a portion of the ultrasonic signal pulse at the interface surface between said coupling means and said object surface, and said signal reflecting surface being adapted to reflect such received signal through said liquid coupling means back to said electroacoustic transducer to provide an echo signal;

electrical pulsing means coupled for periodically energizing said electroacoustic transducer and causing said transducer to transmit said ultrasonic signal pulse;

electrical circuit means including time gate means coupled to said electroacoustic transducer and being responsive to said electrical pulsing means for determining the absence of said echo signal within a predetermined time interval subsequent the transmitting of said signal pulse;

said probe having projections for contacting said object in fixed spatial relation, and the acoustic signal path from said transducer through said coupling means to said interface surface, from said interface surface through said coupling means to said signal reflecting surface, and from said signal reflecting surface through said coupling means to said transducer forming a substantially triangular path.

4. In a pulse-echo ultrasonic test apparatus the combination of:

a transducer probe adapted to be inserted into a tubular object, said probe comprising a housing mounting an electroacoustic transducer which is adapted to periodically transmit an ultrasonic signal pulse through a liquid coupling means into the tubular object to be tested, said coupling means if adequately filling the space between said object and said probe in combination with the orientation of said electroacoustic transducer relative to said object causing said signal pulse to enter the surface of said object to be tested at an angle deviating from 90°;

a signal reflecting surface disposed on said housing and exposed for contact with said coupling means for receiving an acoustic signal arising from a reflection of a portion of the ultrasonic signal pulse at the interface between said coupling means and said object surface, and said signal reflecting surface being adapted to reflect such received signal through said liquid coupling means back to said electroacoustic transducer to provide an echo signal;

electrical pulsing means coupled for periodically energizing said electroacoustic transducer and causing said transducer to transmit said ultrasonic signal pulse;

electrical circuit means including time gate means coupled to said electroacoustic transducer and being responsive to said electrical pulsing means for determining the absence of said echo signal within a predetermined time interval subsequent the transmitting of said signal pulse;

said probe having projection for contacting said object in fixed spatial relation, and feeding means for feeding said liquid coupling means into said space, said feeding means being coupled to said electrical circuit means foe being activated in the absence of said echo signal.